United States Patent [19]

Murrell et al.

[11] Patent Number: 4,778,779

[45] Date of Patent: Oct. 18, 1988

[54] CATALYSTS COMPRISING SILICA SUPPORTED ON ALUMINA, THEIR PREPARATION AND USE

[75] Inventors: Lawrence L. Murrell, South Plainfield; Nicholas C. Dispenziere, Jr., Wall; David E. Vaughan, Flemington, all of N.J.

[73] Assignee: Exxon Research and Engineering Company, Florham Park, N.J.

[21] Appl. No.: 37,506

[22] Filed: Apr. 13, 1987

Related U.S. Application Data

[63] Continuation of Ser. No. 815,203, Dec. 21, 1985, abandoned.

[51] Int. Cl.$^4$ .............................................. B01J 21/12
[52] U.S. Cl. ..................................... 502/263; 502/355; 502/439; 502/527; 423/327
[58] Field of Search ............... 502/263, 355, 439, 527; 423/327

[56] References Cited

U.S. PATENT DOCUMENTS

| | | | |
|---|---|---|---|
| 2,375,757 | 5/1945 | Bates | 208/118 |
| 2,489,334 | 11/1949 | Shabaker | 502/263 |
| 2,493,896 | 1/1950 | Pardee et al. | 502/263 |
| 3,104,943 | 9/1963 | Berry | 423/327 |
| 3,242,069 | 3/1966 | Gladrow et al. | 208/120 |
| 3,257,310 | 6/1966 | Plank et al. | 502/263 |
| 3,662,002 | 5/1972 | Magerlein et al. | 502/263 |
| 3,819,651 | 6/1974 | Worbs et al. | 502/263 |
| 3,826,813 | 7/1974 | Gardner et al. | 423/327 |
| 3,857,923 | 12/1974 | Gardner et al. | 423/327 |
| 3,898,182 | 8/1975 | Brown et al. | 502/263 |
| 3,943,064 | 3/1976 | Ballain et al. | 501/128 |
| 4,013,589 | 3/1977 | Buonomo et al. | 502/263 |
| 4,094,690 | 6/1978 | Morton | 501/128 |
| 4,337,366 | 6/1982 | Fattore et al. | 502/263 |
| 4,376,036 | 3/1983 | Garwood et al. | 208/120 |
| 4,392,988 | 7/1983 | Dobson et al. | 502/263 |
| 4,442,223 | 4/1984 | Chester et al. | 502/68 |
| 4,604,373 | 8/1986 | Clark | 502/73 |
| 4,628,042 | 12/1986 | Speronello | 502/263 |
| 4,631,269 | 12/1986 | Lachman et al. | 502/439 |

*Primary Examiner*—Anthony McFarlane
*Attorney, Agent, or Firm*—Joseph J. Dvorak

[57] ABSTRACT

Useful cracking catalysts and catalyst supports comprising silica supported on alumina are prepared by compositing particles of silica or silica precursor with particles of porous alumina and subjecting the resulting composite to high temperature steaming in a non-reducing environment at a temperature of at least about 500° C. for a time sufficient to disperse at least a portion of the silica over the alumina surface. The silica wets, spreads out and reactions with the surface hydroxyul groups of the alumina. The supported silica on alumina composites that can be made from this process may exhibit properties of both bulk silica and bulk alumina at the same time, bulk silica and alumina whose exterior surface only has been modified with silica as wells as composites exhibiting surface properties different from both bulk silica and bulk alumina.

10 Claims, 3 Drawing Sheets

CATALYSTS COMPRISING SILICA SUPPORTED ON ALUMINA, THEIR PREPARATION AND USE

This is a continuation of application Ser. No. 815,203, filed Dec. 31, 1985, abandoned.

BACKGROUND OF THE INVENTION

1. Field of the Invention

This invention relates to catalysts and catalyst supports comprising silica supported on alumina, their preparation and use. More particularly, this invention relates to cracking catalysts and catalyst supports comprising silica supported on alumina which are prepared by compositing particles of silica or hydrated silica with particles of alumina and subjecting said composite to high temperature steaming at a temperature of at least about 500° C. for a time sufficient for at least a portion of said silica to react with and to disperse over the exterior and internal pore surface of the alumina.

2. Background of the Disclosure

Use of silica-alumina composites as catalysts and as catalyst support materials is well known to those skilled in the art. These catalysts are prepared in many different ways such as co-precipitation, various co-gel techniques, by contacting alumina with various silica precursor salt such as organo-silanes, including alkoxy silanes followed by calcination of the so-formed composite to produce the desired silica-alumina material. Use of the latter techniques enables one to obtain an alumina whose surfaces are partly or completely covered with silica as opposed to a homogeneous or heterogeneous silica-alumina compound.

BACKGROUND OF THE DISCLOSURE

U.S. Pat. No. 4,440,872 to Grenoble et al discloses various acid cracking catalysts. Some of the catalyst supports are prepared by impregnating gamma alumina with a saline compound followed by either calcining or steaming the impregnate at 500° C. The calcined support material is then impregnated with ammonium meta-tungstate which is steamed at high temperature to form a catalyst. Peters et al in U.S. Pat. No. 3,671,432 disclose a process for preparing a supported transition metal of Group V or VI of the Periodic Table which includes mixing a water dispersible transition metal compound with particles of support material and calcining the mixture at a temperature of from 200°–1000° C. However, the disclosure contains examples employing only either chromium trioxide or vanadium pentoxide as the water dispersible transition metal compounds. U.S. Pat. No. 3,668,151 mixes particulate zinc oxide with particulate gamma alumina and calcines the mixture at 600°–1500° C. Browning et al in U.S. Pat. No. 3,182,012 prepare a cracking catalyst comprising cobalt and molybdenum on a silica-alumina support. The silica and alumina may be mixed as dry powders, but the cobalt and molybdenum are deposited on the support by impregnation. The final impregnate is calcined at 600°–1200° F.

In U.S. Pat. No. 2,830,960 Broomhead mixes cobalt formate, molybdic acid and an alumina hydrogel, followed by drying and calcining the mixture at 450°–650° C. Porter et al in U.S. Pat. No. 2,640,802 discloses mixing powdered cobalt oxide, molybdic oxide and alumina, pelleting the mixture and heating the pellets for two hours at 530° C. U.S. Pat. No. 3,151,091 discloses preparing alumina based catalysts by dry mixing alumina with an oxide of a metal selected from the group consisting of the iron transition metals, molybdenum, tungsten, vanadium and mixtures thereof and calcining the resulting mixture at 800°–1200° F.

U.S. Pat. No. 2,394,796 discloses impregnating a porous, hydrated alumina, including boehmite, with silicon tetrachloride or tetraethylsilicate, followed by hydrolysis of the impregnate to form silica. In U.S. Pat. No. 2,493,896 an alumina support material is impregnated with ethylsilicate or a polymer of ethylsilicate, followed by calcination. Multiple impregnations, with calcining after each impregnation, are said to yield a catalyst containing up to 50 wt.% silica. In U.S. Pat. No. 4,172,809 a process for preparing alumina extrudates is disclosed wherein a silicon compound is added to an alumina gel during extrusion of the gel. The resulting extrudate is then calcined. U.S. Pat. No. 2,579,123 discloses reactivating deactivated silica-alumina catalysts by impregnating with a silicon or silicate compound, followed by calcination.

U.S. Pat. No. 3,502,595 discloses the preparation of silica-alumina catalysts by impregnating a hydrated alumina, including boehmite, with one or more organic esters of silicon followed by calcination. U.S. Pat. No. 4,038,337 discloses the preparation of a silica-alumina catalyst by reacting gamma or eta alumina with various esters of orthosilicic acid followed by calcination. U.S. Pat. No. 4,080,284 discloses contacting a support material, such as alumina, with an organic or halogen-substituted silane. The silylated support material is then calcined, followed by steaming at 900°–1600° F.

U.S. Pat. No. 4,013,589 discloses a process for improving the mechanical and thermal properties (stability) of gamma alumina by impregnating the alumina with a hydrolyzable silicone compound and hydrolyzing the impregnate to convert the silicone compound to silica. Temperatures of up to 500° C. are employed for the hydrolyzing step. In one example, a negative comparative example, the alumina was impregnated with a "Ludox" slurry (a solution of colloidal silica) followed by calcination in air at 500° C.

SUMMARY OF THE INVENTION

It has now been discovered that useful cracking catalysts and catalysts supports comprising silica supported on the surface of alumina can be prepared by compositing particles of silica with particles of alumina and steaming the composite at high temperature. Thus, the composite will be heated at a temperature of at least about 500° C. in a non-reducing environment and in the presence of steam for a time sufficient for at least a portion of the silica to react with the alumina. In most embodiments of this invention, the silica will also spread out, wet and disperse over at least a portion of the alumina surface. In a preferred embodiment of the process of this invention the steaming temperature will be at least about 700° C.

In one embodiment the alumina will be porous possessing both external and internal surface and the silica will spread out, wet and disperse over at least a portion of both the external and internal surface of the porous alumina particles.

A number of different compositions comprising silica supported on the surface of alumina may be prepared employing the process of this invention, some of which are believed to be novel. The resulting composition will be a function of (i) the time, temperature and water content of the steaming treatment; (ii) the relative particle sizes of the silica and alumina; (iii) the amount of silica employed or composited with the alumina; (iv) the porosity of the alumina, and (v) the nature of the silica or silica precursor. The different types of composition which can be prepared employing the process of this invention are set forth below:

(a) Discrete particles of silica supported on the external surface of the alumina which exhibit properties of bulk silica, so that the resulting composite exhibits, in part, properties of both bulk silica and bulk alumina.

(b) Discrete islands or areas of silica in a non-crystalline form supported principally on the external surface of the alumina which exhibit properties substantially different from those of bulk silica so that the composite exhibits properties of bulk alumina and non-crystalline, non-bulk silica.

(c) A composition wherein the surface of the alumina is covered with silica in a non-crystalline form which exhibits properties different from either bulk silica or bulk alumina.

(d) Compositions wherein discrete islands and/or particles of silica exhibiting properties of bulk crystalline or non-crystalline silica are supported on the surface of a layer of silica in non-crystalline form;, non bulk which, in turn, is supported on and reacted with the surface of the alumina, so that the composite exhibits properties of both bulk silica and that of non-crystalline silica supported on alumina, wherein the non-crystalline or amorphorous silica exhibits properties different from either bulk crystalline or bulk amorphous silica.

Thus, it will be appreciated that the compositions that can be prepared by the process of this invention will range from alumina whose surface is partially covered with and which supports discrete areas or island and/or particles of silica in a non-crystalline form so that the composition exhibits phase properties of both alumina and a non-crystalline silica having properties different from either alumina or silica, to alumina whose surface is completely covered with a supported silica phase in an amount such that the composition exhibits the properties of a non-crystalline silica phase.

DETAILED DESCRIPTION

Figure 1:
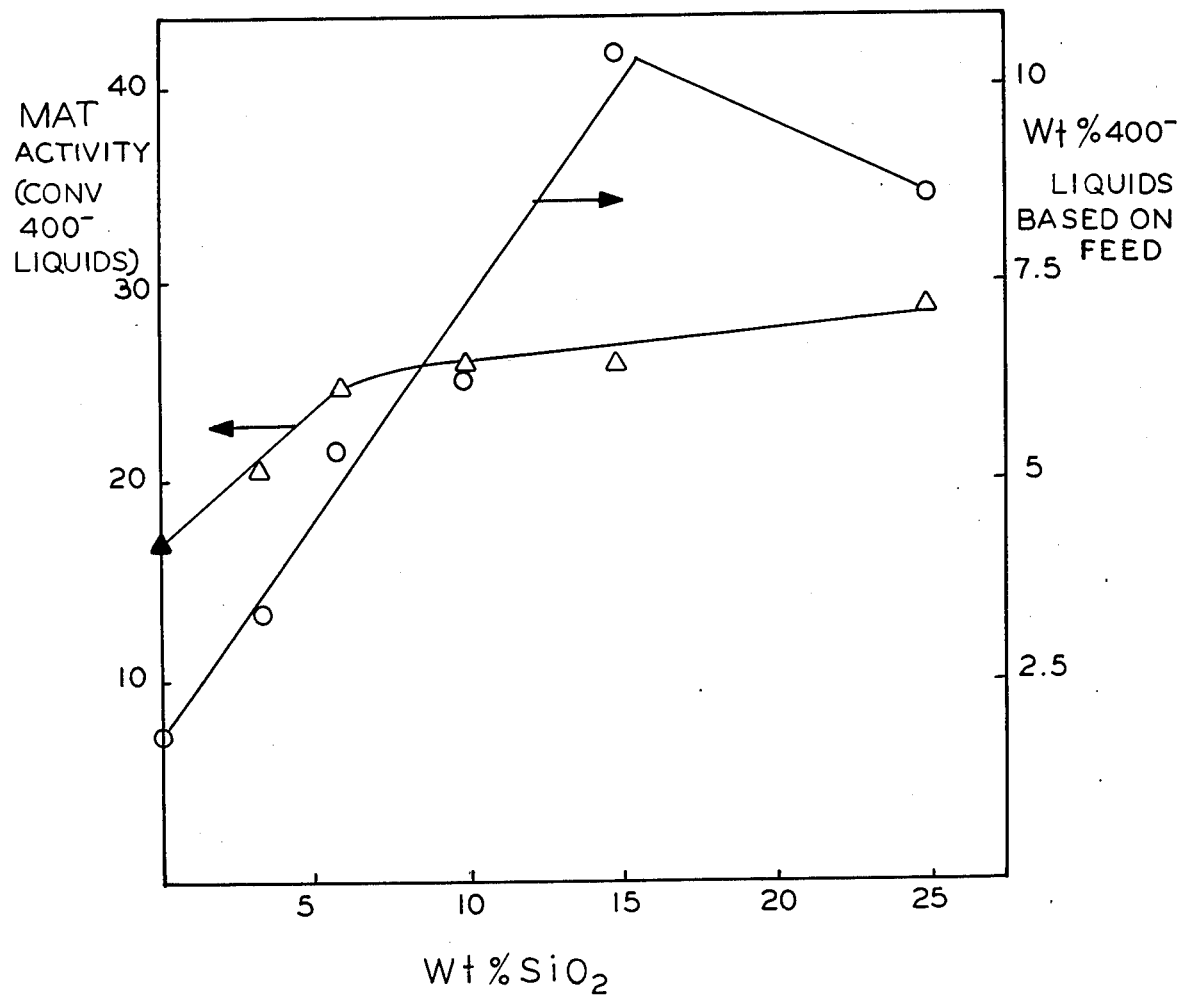
FIG. 1 is a graph illustrating micro-activity test results for compositions prepared by the process of this invention as a function of silica loading.

In the process of this invention, the high temperature steaming treatment causes the silica to react with the alumina. While not wishing to be held to any particular theory, those skilled in the art know that alumina is not simply represented by the formula $Al_2O_3$. Instead, the alumina is usually in the form of a hydrate in the sense that it contains varying amounts of water which can be removed at elevated (and usually considerably elevated) temperatures. In large part, the "hydrates" are manifested as surface hydroxyl groups, which themselves are important modifiers of the surface properties of alumina. It is believed that these surface hydroxyls on the alumina react with the silica with the formation of an oxygen-silica bond, such that two oxygens of the hydroxyls on the alumina surface replace two oxygens bound to the silica. Thus, the silica that reacts with the surface of alumina forms a surface phase complex. This surface phase complex is non-crystalline in form and exhibits properties substantially different from either bulk silica or bulk alumina.

In order to understand the compositions of this invention and the process employed in preparing them, it is important to understand that aluminas are porous materials. That is, there are a multitude of pores and channels from the exterior of a discrete, macroscopic particle to the interior of the particle. Consequently, the surface of an alumina particle includes all the pores and channels of said alumina and their surface area as measured by nitrogen gas adsorption according to BET theory. Thus, there is much more surface in the interior of such a discrete, macroscopic particle of alumina than on its exterior surface. In this application, "surface" is used in such an art-recognized fashion and, unless expressly stated otherwise, it is not to be restricted to the physical exterior surface of a macroscopic particle of the alumina.

By way of example, Engelhard reforming grade of gamma alumina has an average particle size, expressed as the diameter, of about 44 micron. The average diameter of the channels or pores after calcining this alumina at 500° C. in air is from about 70-75 Å. The average particle size of, for example, colloidal silica ranges from 20 to 200 Å. Colloidal silica comprises colloidal size particles of silica with a hydrated surface and is generally available in the form of an aqueous slurry. These colloidal silica sols are sold, for example, by DuPont under the trademark LUDOX. Thus, if one mixes a colloidal slurry of hydrated silica with a reforming grade of particulate alumina with sufficient water present to completely wet the pores of the alumina, one will obtain, on drying, a composite which one can ideally represent as large spheres of alumina having holes and channels dispersed there through of a diameter of about 70-75 Å, with spheres of silica on the external surface of said large particle of alumina wherein the silica spheres or hydrated silica spheres may have an average diameter of about 200 Å.

In such a case the particle size of the silica is too large to fit into the pores and channels of the alumina. Therefore, the silica particles are present on the exterior surface of the alumina. The amount of silica present can be such that each particle of silica is ideally considerably separated from the next nearest particle of silica or so much silica can be present that the particles of silica completely cover the surface of the alumina and the silica particles may interact with one another. In this composite which is merely dried, but not steamed, the silica has not reacted with the surface hydroxyls of the alumina.

One can readily envision that when such a composite is steamed, what will initially happen will be that the silica will react with the surface hydroxyls present on the exterior surface of the alumina in the vicinity of the point of intimate contact between each particle of silica and the alumina surface. Thus, one can, under the right conditions of loading and particle size of the silica particle, obtain a composite comprising discrete particles of silica, a portion of which has reacted with the surface hydroxyls of the exterior surface of the particles and which is bound therefore to the exterior surface of the alumina. Such a composite will exhibit properties of both bulk alumina and bulk silica. At this point, if the steaming treatment continues the silica will start to spread out over the surface of the alumina essentially in the form of a monolayer or surface phase complex, including penetration into the internal pores and channels of the alumina. One can envision that during the initial phases of this wetting, dispersing and reacting of the silica with the surface hydroxyls of the alumina, a point will be reached where particles of bulk silica rest or are supported on an island of silica on the alumina in the form of a surface phase complex; so that if the steaming treatment were to be stopped at this point, one would have a composition exhibiting the properties of bulk alumina, bulk silica and a surface phase silica complex which has properties different from both bulk silica and bulk alumina.

If the steaming treatment is continued, then most of the crystalline silica phase will ultimately spread out, react with and disperse over both the exterior and interior surface of the alumina. If the initial silica loading is sufficiently low, then one will obtain a composite comprising discrete areas of the surface phase silica complex which has reacted with the alumina hydroxyls interspersed with areas of alumina which have not been wet by and reacted with the silica due to an insufficient amount of silica on the alumina when the process started. In such a case, one will have a composite which exhibits properties of both bulk alumina and the surface phase silica complex which has properties different from either bulk alumina or bulk silica.

On the other hand, if the silica loading is sufficient, then one can obtain a composite wherein all of the alumina surface is covered by and supports the surface phase silica complex so that the resulting composite exhibits properties different from both bulk silica and bulk alumina. By way of example, if the alumina has a total BET surface area of about 200 m²/g, the amount of silica required to get what one may term to be essentially a saturation monolayer coverage of silica on the alumina support would be about 10 wt.% silica. By 10 wt.% silica is meant that the 10 wt.% silica of the total silica-alumina composite.

To carry this progression further, if the silica loading is above that required to achieve saturation monlayer coverage, then it becomes immediately obvious that one will have alumina whose surface is covered with a saturation monolayer of surface phase silica complex which, in turn, supports discrete areas of bulk silica. In this case the composite would exhibit properties of the surface phase complex and those of bulk silica at the same time.

Grinding experiments in combination with ESCA analysis have suggested that areas of bulk silica exist both on the exterior surface of the alumina and in the pores of the alumina. The dispersion of the silica into the pores appeared to be fairly uniform, with the extent of dispersion being a function of time and temperature.

Thus, one can readily understand from the above discussion, that the final composition will be a function of the many variables set forth under SUMMARY OF THE INVENTION, which includes (i) the time, temperature and steam content of the steaming treatment; (ii) the relative particle sizes of the silica and alumina; (iii) the silica loading or amount of silica relative to the amount of alumina employed; (iv) the porosity of the alumina, and (v) the nature of the silica or silica precursor.

With regard to the relative particle sizes of the silica or silica precursor and the alumina, the above discussion relating to the use of, for instance, an Engelhard reforming grade of gamma alumina having an average diameter of about 44 micron which corresponds to a mesh size of 325 (Tyler) results in the various compositions that can be made employing the process of this invention. On the other hand, when an Engelhard reforming grade of gamma alumina was employed in the process of this invention having a mesh size of 60 (Tyler) which corresponds to an average particle diameter of 250 micron, ESCA analysis found that when this was slurried with silica with sufficient water to wet the pores of the alumina, the silica did not diffuse significantly into the pores of the 60 mesh alumina material following a steam treatment. Thus, even after a 32 hour steam treatment at 870° C. employing 90% steam with 10% $N_2$, the atomic percent of silica as measured by ESCA was 17. It has been found that this value is similar to that expected for a composition employing gamma alumina and silica in the form of a colloidal silica slurry wherein the silica has been found to be entirely on the exterior surface of the alumina particle. Thus, this gives rise to the conclusion that the silica surface diffusion or dispersion is relatively sluggish when diffusion or dispersion over significant geometric distances is required. Thus, where it is desired to make relatively large mesh sizes alumina materials, such as pills or extrudates, which are subsequently reacted with the silica with a subsequent steaming step, the composite will have to be formed before the particles are compacted into larger mesh size composite, such as pills or extrudates.

The amount of steam employed in forming the compositions of this invention may vary over a wide range, i.e., from less than about 1% to more than 90% of the non-reducing, steaming environment. Compositions of this invention have been made employing as little as 3% steam to as much as 90% steam. In general, the more steam that is employed the faster will be the reaction of the silica with the alumina surface.

In general, the loading level of the silica will be such that the amount of silica will range from about 1–50 wt% of the total composition and more generally from about 1–25 wt% of the total composition. Preferably the amount of silica will be present in an amount of from about 1 to 20 wt% of the total composition, more preferably from about 2–10 wt% and most preferably from about 4–6 wt%.

In order to confirm the fact that a relatively large mesh size alumina when slurried with a colloidal silica slurry and then steamed in order to disperse the silica would, in fact, not disperse the silica into the alumina pores the following experiment was performed. An alumina extrudate was slurried with sufficient colloidal silica slurry to completely coat the extrudate with silica. This material was steamed at 870° C. and comprised a thin outer coating of silica from the colloidal silica slurry. This thin outer coating was removed by gentle abrasion with a sharp metal blade, and then analyzed by ESCA. No silica could be detected by the ESCA on the external surface of this extrudate with the silica coating removed.

In general, it has been found that alumina particle sizes of about 80 microns or smaller are suitable for the process of this invention. Compositions made by the process of this invention in the form of larger particles or extrudates may be formed by spray drying, tableting or extruding composites which contain a mixture of the alumina and silica which have not yet been steamed. Once these larger particles are formed, the silica is then dispersed to form a composition by the process of this invention via the high temperature steaming in a non-reducing environment or atmosphere.

It is to be noted that the process of this invention of dispersing the silica onto the surface of alumina by the high temperature steam treatment in a non-reducing atmosphere onto alumina will not work with oxides or oxide salt precursors of, for example, titanium, zirconium, hafnium, vanadium, niobium, tantalum and chromium. That is, none of these oxides or oxide precursors will disperse onto the surface of alumina via the high temperature steam treatment process of this invention.

In the process of this invention, the silica source may be colloidal silica in the form of an aqueous slurry or particles of silicic acid which is a form of hydrated silica. Alternatively, if convenient, the silica source may also be in the form of a suitable, insoluble silica precursor material such as silicon tetraacetate, silicon acetalacetonate, silicon oxylates, etc. The important requirement is that the precursor material be one which, when subjected to the steaming treatment in the non-reducing atmosphere, fairly readily converts to silica under the conditions of the steaming treatment of the process of this invention.

Referring to FIG. 1, the micro activity test results for compositions prepared according to the process of this invention were prepared employing 325 mesh Engelhard reforming grade of gamma alumina and with a colloidal silica slurry sold by DuPont under the trademark LUDOX AS-40 as the silica source. The catalyst samples were prepared by adding enough water to the colloidal silica slurry and then adding the slurry to the alumina particles such that all the pores of the alumina were wet with water. Prior to this, the gamma alumina particles were calcined at 500° C. in order to ensure that the hydroxyl surface was free from contamination, such as adsorbed hydrocarbons, oxygenated hydrocarbons, etc. After addition of colloidal silica to the 325 mesh gamma alumina, the samples were dried at 120° C. and then subjected to steaming at 870° C. for 16 hours in a flowing atmosphere of 90% water and 10% nitrogen. The Figure shows the relationship of this MAT catalytic cracking activity and percent conversion to gasoline range liquids for the samples as a function of silica content. These results show that the conversion to 400− liquids is directly related to the silica content up to about 15 wt.% silica. The direct relationship of silica content and cracking selectivity to liquids would imply, but is not of itself proof, that the silica is dispersing onto the alumina surface.

The results of FIG. 1 are further understood by reference to Table 1 which shows the ESCA surface analysis of samples prepared employing 10 wt.% $SiO_2$ on the gamma alumina using the colloidal silica slurry as the source of silica. Different conditions were used in an attempt to disperse the silica phase onto the alumina. Referring to Table 1, it can be seen that steaming for one hour in a 20% oxygen-helium gas containing 5% water did not serve to disperse the silica. It should be noted that the catalytic cracking activity of 21 (MAT test) is about the same as that of alumina itself. The sample that was calcined for 16 hours at 950° C. also shows little improved cracking activity and very little production of gasoline range liquids. The percent silica has decreased and the percent alumina increased according to the ESCA results, because under these conditions it has been observed in the electron microscope that the high temperature calcination causes the alumina to collapse internally. That is the internal surface area starts to collapse resulting in an external surface that takes on a puckered or wrinkled appearance. Thus, while the internal surface is collapsing the external surface is slightly increasing. This accounts for the lower amount of silica and higher amount of alumina by the ESCA analysis. It is only when a sample was steamed for 16 hours in a 90% steam environment at 870° C. that we see a significant decrease in silica by ESCA along with a concomitant increase in alumina by ESCA, as well as increase in the MAT activity and significant amounts of gasoline range liquids. This serves to substantiate that under those conditions the silica was dispersing over the surface of the alumina.

It should be noted that a sample of Engelhard gamma alumina that had been calcined at 500° C. and then steamed at 870° C. for 16 hours with 90% water on 10% $N_2$ had a surface area of 115 $m^2/g$. By way of comparison, a sample containing 10 wt.% silica on alumina prepared from the Engelhard gamma alumina and the colloidal silica slurry which was steamed at 870° C. under the same conditions had a surface area of 160 $m^2/g$. This demonstrates how the silica stabilizes the surface area of the alumina resulting in a composition having high thermal stability.

Table I gives the ESCA surface analysis for 10 wt.% $SiO_2$ on $\gamma$-$Al_2O_3$ treated at different conditions. This sample was prepared by contacting colloidal $SiO_2$ in enough water to fill the pores of the $Al_2O_3$. As the colloidal $SiO_2$ particles are of the same size as the pores of the alumina, $SiO_2$ deposition will be largely restricted to the exterior of the alumina particles. (Strong adsorption of negatively-charged $SiO_2$ particles onto the alumina surface will also inhibit a uniform distribution.) The ESCA results for the 10% $SiO_2$ sample following drying at 120° C. support this conclusion. The Al atomic % of 6.6 for this sample is very much reduced compared to that expected for a monolayer of $SiO_2$ on $Al_2O_3$, about 32 (see Table 2). The colloidal $SiO_2$ particles are clearly "blocking" or "shadowing" the outer $Al_2O_3$ surface to ESCA analysis. ESCA is a particularly sensitive technique for these systems because physical mal-distribution on the $Al_2O_3$ supports occurs at the outset of the sample preparation. Calcination at 500° or steam treatment with 5% $H_2O$ in 20% $O_2$-80% He at 870° C. failed to disperse the colloidal $SiO_2$ phase into the pores of the $Al_2O_3$ as shown by the Al atomic %. This conclusion is consistent with the cracking activity for this particular steamed sample which is very similar to $Al_2O_3$ itself, see Table 1. The important conclusion is that small $SiO_2$ particles can be inert to extensive surface migration under certain steaming conditions—they stay on the $Al_2O_3$ outer support surface. Calcination at 950° C. or steam treatment at 870° C. in 90% $H_2$.10% $N_2$ leads to a decrease in the Si% and a marked increase in the Al%. Although the $SiO_2$ may not be completely dispersed by these treatment conditions, a point which will be discussed subsequently, it is apparent that this steaming treatment leads to improved cracking activity. The ESCA results for the two steamed samples in Table 1 clearly point to the reason one catalyst is essentially catalytically inactive and the other quite active. In fact, the cracking activity of the higher activity sample is near the maximum ever observed for this level of $SiO_2$ reacted with an $Al_2O_3$ surface.

TABLE I

ESCA Surface Analysis of 10 wt. % $SiO_2$ on $\gamma$-$Al_2O_3$ of 325 mesh
Prepared Using Colloidal Silica At
Different Conditions to Disperse the $SiO_2$ Phase.
Catalytic Cracking Studies Are Also Included For Steamed and Calcined Sample

| Sample Treatment Conditions | Increased Severity of Treatment | Atomic % Si[1] By ESCA | Atomic % Al[1] By ESCA | Catalytic Cracking[2] Activity | Wt. % 400° F.− Liquids |
|---|---|---|---|---|---|
| Sample Prepared and Dried at 120° C. | ↓ | 14.8 | 6.60 | — | — |
| Calcination at 500° C. 16 hr. | ↓ | 14.8 | 16.3 | — | — |
| Steam 870° C., 1 hr. (20% $O_2$/5% $H_2O$/He Balance) | ↓ | 10.6 | 11.3 | 21 | 1.9 |
| Calcination at 950° C. 16 hrs. | ↓ | 8.36 | 24.6 | 23 | 1.7 |
| Steam 870° C., 16 hr.[3], (90% $H_2O$-10% $N_2$) | ↓ | 6.95 | 24.9 | 26 | 8.3 |

[1]Calculated Atomic % Si is 3.38, calculated Atomic % Al is 35.94.
[2]Micro Activity Test.
[3]Surface Area 157 $m^2$/g.

Because of the sensitivity of ESCA in determining the conditions for the diffusion of $SiO_2$ into the pores of $Al_2O_3$ a 2 wt.% $SiO_2$ on $\gamma$-$Al_2O_3$ material was investigated. It can be argued that a lower $SiO_2$ content sample will be more sentive to the conditions where $SiO_2$ would diffuse into the pores, since this $SiO_2$ content is well below the saturation "monolayer" coverage of the $Al_2O_3$ support. This is not the case for the 10% $SiO_2$ on $Al_2O_3$ sample previously discussed. It is possible that the 2% $SiO_2$ sample must first saturate the outer $Al_2O_3$ surface before diffusing into the $Al_2O_3$. In this case, diffusion for the 2% $SiO_2$ sample would appear to be slower than the 10% $SiO_2$ sample. Fortunately, the results are quite clear for the 2% $SiO_2$ sample suggesting that the saturation of the outer $Al_2O_3$ surface occurs simultaneously with diffusion into the pores. Of all the treatment conditions in Table 2, only one was effective in diffusing $SiO_2$ into the pores. Even $NH_3$ failed to aid in the $SiO_2$ dispersion in steam. Only a steaming treatment with a high steam content was effective in dispersing the silica phase. In the case of a 5% $SiO_2$ preparation, this same steaming condition was effective in dispersing the silica phase, see Table 2. The final surface area for the 5% $SiO_2$ sample was 40% higher than that of the 2% $SiO_2$. This difference probably reflects a completion of $SiO_2$ dispersing onto the $Al_2O_3$ surface under conditions where the $Al_2O_3$ surface area is decreasing to form large pores in the final composition. Comparisons of the surface areas of these two colloidal silica prepared samples compares favorably with results for samples prepared using an expensive alkoxysilane precursor. These surface areas stabilization results coupled with the ESCA studies show that $SiO_2$ diffuses into the pores of a $\gamma$-$Al_2O_3$ support. For example, the 5% $SiO_2$ on $\gamma$-$Al_2O_3$ sample prepared from colloidal silica has excellent catalytic activity coupled with the ESCA indicating good $SiO_2$ dispersion on the $Al_2O_3$ surface.

Table 2 also contains comparative ESCA studies for conventional co-gel prepared materials. The marked change in the Si atomic % for the calcined and the steamed 2% $SiO_2$.98% $Al_2O_3$ co-gel argues convincingly for segregation of $SiO_2$ to or toward the surface upon steam treatment. Nevertheless, the final surface structure and pore distribution of steamed co-gels is quite different from the colloidal silica prepared samples.

TABLE 2

ESCA Analysis of Colloidal Silica-Prepared, Silicon-Alkoxide-Prepared, and Co-Gel Prepared Silica-Alumina Samples

| Sample | Prep | Treatment Condition, 16 hrs. | Surface Area ($m^2$/g) | At % Si | At % Al | At % O |
|---|---|---|---|---|---|---|
| 2% $SiO_2$/$Al_2O_3$ | "Ludox" | Calcined 500° C. | 196 | 9.6 | 19.5 | 70.8 |
| 2% $SiO_2$/$Al_2O_3$ | "Ludox" | Stm 870° C. (20% $O_2$/5% $H_2O$/He Balance) | 120 | 9.0 | 21.0 | 70.1 |
| 2% $SiO_2$/$Al_2O_3$ | "Ludox" | $NH_3$ Stm 870° C. (20% $O_2$/5% $H_2O$/He Balance) | 120 | 9.2 | 22.0 | 68.9 |
| 2% $SiO_2$/$Al_2O_3$ | "Ludox" | Stm 870° C. (90% $H_2O$-10% $N_2$) | 117 | 1.0 | 31.8 | 67.2 |
| 5% $SiO_2$/$Al_2O_3$ | "Ludox" | Stm 870° C. (90% $H_2O$-10% $N_2$) | 160 | 1.6 | 31.8 | 66.6 |
| 5% $SiO_2$/$Al_2O_3$ | Impregnation using $Si(OEt)_4$ | Calcined 500° C. | 220 | 1.4 | 32.2 | 66.4 |
| 2% $SiO_2$/$Al_2O_3$ | Co-Gel | Calcined 500° C. | 550 | 0.1 | 30.3 | 69.6 |
| 2% $SiO_2$/$Al_2O_3$ | Co-Gel | Calcined 500° C. Stm 870° C. (90% $H_2O$-10% $N_2$) | 130 | 0.6 | 31.5 | 66.9 |

Table 2 also contains the ESCA analysis of a 5% $SiO_2$ on $\gamma$-$Al_2O_3$ sample prepared using tetraethoxysilane. This sample was calcined at 500° C. and serves as a standard for the other samples in Table 2. The Si atomic percent of this sample can be compared to the other samples in Table 2 by multiplying the ratios of the surface areas and by the ratio of the $SiO_2$ contents. For example, in the case of the 2% $SiO_2$ on $Al_2O_3$ of 117 $m^2$/g, the calculated Si atomic % would be: $1.44 \times (220/117) \times (2/5) = 1.1$ . As the observed Si atomic % is 1.0, it is apparent that for this colloidal silica prepared sample that excellent dispersion has been achieved by the steam dispersion treatment.

Figure 2:
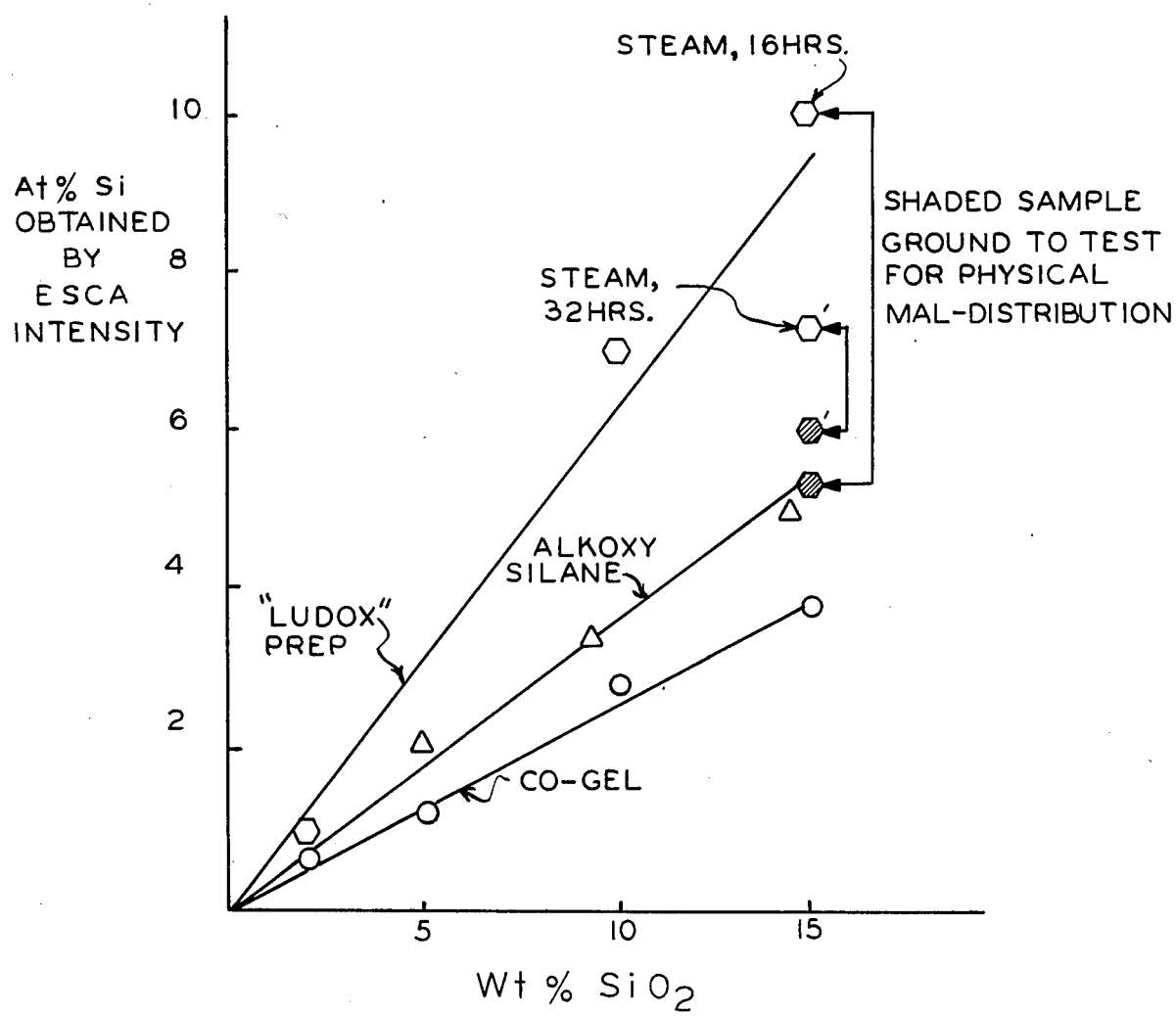
FIG. 2 is a graph of the atomic % of silica, as determined by ESCA intensity of compositions prepared by the process of this invention as a function of silica loading.
Figure 3:
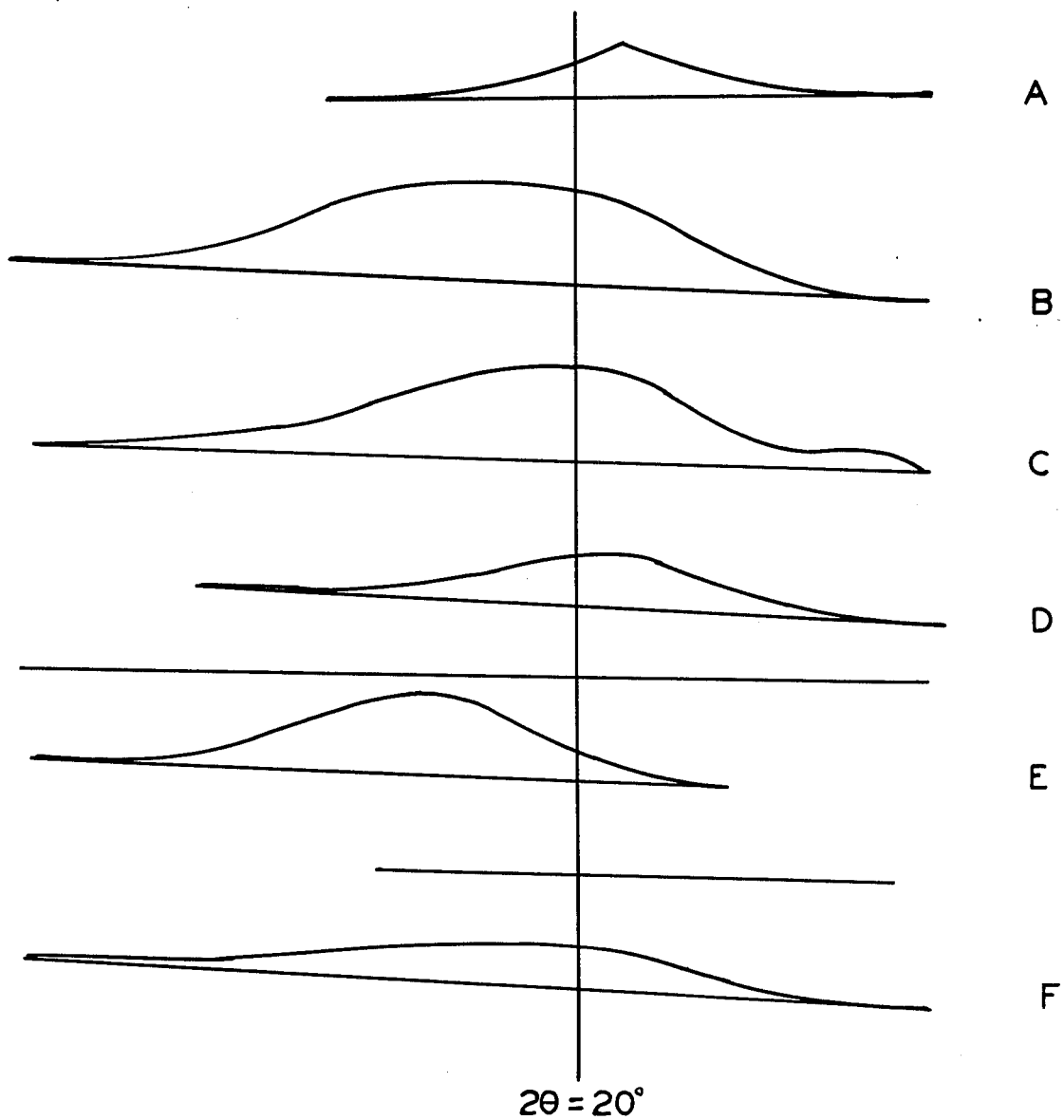
FIG. 3 is a graphic representation of x-ray powder diffraction spectrums of $\gamma$-$Al_2O_3$ and 15 wt.% $SiO_2$/$\gamma$-$Al_2O_3$ that were subjected to different thermal treatments.

FIG. 2 is a composite of the ESCA results colloidal silica-prepared, silicon alkoxide, and co-gel prepared materials plotted as a function of silica content. It is apparent that the co-gel and silicon alkoxide prepared samples define two straight lines with the co-gel samples line well below the alkoxysilane samples line. Silica in the interior of the co-gel phase is the explanation for the lower Si atomic percent being observed compared to alkoxy-preparations. The third straight line in FIG. 3 is for colloidal silica prepared samples and this line is higher than for the other series of samples. This is a reflection of silica mal-distribution due to a failure to disperse the silica uniformly onto the $Al_2O_3$ surface. This point was proven by physical grinding of the 15% $SiO_2$ sample prepared from colloidal silica. Grinding halved the Si atomic percent measured by ESCA. Grinding does not change the atomic % for an alkoxide prepared sample indicating that grinding exposes pore surface area and does not expose bulk $Al_2O_3$ area. Also, steaming of another portion of the 15% $SiO_2$ sample for a longer time period leads to an improvement in Si dispersion as shown by a substantial decrease in the atomic % of Si. Grinding of this sample which was steamed for a longer period (32 hours) showed a much smaller change in the atomic % of Si than for the sample steamed for a shorter time period (16 hrs.) compared to the ground sample steamed for the shorter time period.

The invention will be more readily understood by reference to the examples below:

EXAMPLES

Experimental Section

A number of catalysts of this invention were evaluated for gas oil cracking activity in a micro activity test unit (MAT) modified to allow for water addition (steam) along with the feed. The MAT unit is recognized in the industry as a standard diagnostic test unit for cat cracking catalysts [see Ciapetta, F. G. and Henderson, D. J., Oil and Gas J 65 (72), 88, (1967) and Gustofson, W. R., Div. of Pet. Chem, ACS, Preprints 14, B46 (1969).]

The oil feed was an East Texas Light Gas Oil having a boiling range of from 450°–700° F. The operating conditions for the test were:
$H_2O$-Oil mole ratio=3/1
Temp. (catalyst) 900° F. (482° C.)
Pressure 1 atmosphere
(WHSV) oil 8 $hr^{-1}$ (weight hourly space velocity).

The information obtained from the tests (Micro Activity Test Number or MAT number) was the overall vol.% conversion and the amount of conversion to 400° F.⁻ liquids (naphtha gasoline). The Coke Producing Factor (CPF) and Hydrogen Producing Factor (HPF) are the coke and hydrogen production at a given conversion level relative to a steamed $SiO_2$-$Al_2O_3$ catalyst as a reference point. A sample with a CPF and an HPF of 2 would have twice the coke and hydrogen formed at a given conversion level compared to the $SiO_2$-$Al_2O_3$ reference sample.

EXAMPLE 1

The preparation of a 10 wt% $SiO_2$ on $Al_2O_3$ sample was carried out by contacting the $\gamma$-$Al_2O_3$ support, 325 mesh (Engelhard Industries, reforming grade) with a colloidal $SiO_2$ sold by DuPont under the trademark LUDOX AS-40 in sufficient water to fill the pore volume of the support. The impregnating solution was removed by drying at 120° C. for 16 hrs. The dried sample was then used for a series of experiments where portions of the dried sample (Sample A) were treated under different conditions in order to produce active catalytic cracking catalysts. The catalytic cracking activity tests were performed on a modified MAT unit described in the Experimental Section. A portion of Sample A was calcined in a muffle furnace under flowing air at 950° C. for 16 hrs. The MAT activity of this calcined sample was 23 with a conversion to liquids of 1.7 wt% based on feed. The Coke Producing Factor (CPF) and Hydrogen Producing Factor (HPF) for this sample were 0.82 and 2.04, respectively. This sample will be useful for comparison to other samples of the instant invention.

Another portion of Sample A was steamed in 20% $O_2$/He sparged through $H_2O$ (at ambient temperatures) at 870° C. for 16 hrs. in a quartz tube in a horizontal furnace. The MAT activity of this sample was 20 with a conversion to liquids of 2.5 wt% based on feed. The CPF and HPF of this sample were 0.80 and 2.09, respectively. One can see that the activity of this sample is very similar to the sample calcined at 950° C.

Another 10% $SiO_2$ on $\gamma$-$Al_2O_3$ sample was prepared as described previously in this example. A portion of this sample was steamed at 870° C. for 16 hrs. in a muffle furnace with a steam/air atmosphere. The MAT activity of this steamed catalyst was 22 with a conversion to liquids of 3.8 wt% based on feed. One can see that the conversion to liquids of this sample is superior to the other two samples of this example discussed previously.

Another portion of Sample A described previously was steamed in 90% $H_2O$-10% $N_2$ at 870° C. for 1 hr. in a vertical tube furnace. The MAT activity of this steamed sample was 26 with a liquid yield of 8.3 wt% based on feed. The CPF and HPF for this sample were 0.83 and 0.50. This sample shows superior activity and selectivity to liquid products compared to other samples of this example. Also, the coke and hydrogen production of this 1 hr. steamed sample was lower than all of the previous samples.

Another portion of Sample A was steamed in 907 $H_2O$-10% $N_2$ for 16 hrs. at 870° C. in the vertical tube furnace as described previously. The MAT activity of this sample was 26 with a conversion to liquids to 6.3%. The CPF and HPF for this sample were 0.46 and 1.74, respectively. The activity and liquid selectivity of this sample compare favorably with the sample steamed in the vertical tube furnace for 1 hr. In addition, this sample will be useful for comparison to other examples of the instant invention.

One can conclude from the results in this example that active catalysts are produced when a commercial colloidal silica is contacted with $\gamma$-$Al_2O_3$ and then treated at high temperatures in a steam-containing atmosphere. Superior results are clearly obtained for catalysts activated with a high steam partial pressure. The conclusion is clear from this example that calcination at high temperature without steam addition leads to inferior catalysts for $SiO_2$/$Al_2O_3$ catalysts of the instant invention. Comparison of the catalysts of this example to the activity of $\gamma$-$Al_2O_3$ steamed at 870° C. is shown in Table 1. The results in Table 1 summarize the results for this example.

EXAMPLE 2

The preparation of another 10 wt% $SiO_2$ on $\gamma$-$Al_2O_3$ catalyst according to the procedure described in Example 1 was carried out employing a colloidal silica sold by DuPont under the trademark LUDOX AS-40. The details of the preparation were to take 7.5 g of the colloidal silica (40 wt% $SiO_2$ content) mixture and add sufficient distilled water to bring the total volume of the mixture to 16 ml. This mixture contains 3.0 g $SiO_2$. This solution mixture is just sufficient to fill the pores of 27 g of the $\gamma$-$Al_2O_3$ support (Engelhard Industries, reforming grade, 325 mesh). The sample was dried for 16 hrs. at 120° C. and was then steamed at 870° C. for 1 hr. in 90% $H_2O$-10% $N_2$ in a vertical tube furnace. The MAT activity of this sample was 27 with a conversion to liquids of 8.2% wt% based on feed. These results are in excellent agreement with those obtained in Example 1 for a similarly prepared and activated catalyst. The BET surface area of this steamed sample was measured to be $160 M^2/g$ (measured using a Digisorb 2500 as were all the BET surface areas reported in the instant invention). A second portion of this sample was steamed as described above for 16 hrs. and the BET surface area of this sample was 163 $m^2/g$.

Another precursor $SiO_2$ source was used to prepared a 10 wt% $SiO_2$ on $Al_2O_3$ catalyst for comparison to the colloidal silica precursor previously described. In this case silicic acid (Matheson, Collman, and Bell) was employed. The dry silicic acid powder was mixed with sufficient distilled water to bring the total volume of the mixture of 16 ml. This mixture contains 3.0 g $SiO_2$. This solution is just sufficient to fill the pores of the same $\gamma$-$Al_2O_3$ support as described previously in Example 1. This sample was dried for 16 hrs. at 120° C. and was then steamed at 870° C. for 1 hr. as described in this example. The MAT activity of this sample was 25 with a conversion to liquids of 5.5 wt% based on feed. This activity is similar to the "Ludox" prepared sample of this example but the liquid yield is somewhat less than obtained when colloidal silica was used as the $SiO_2$ precursor. The BET surface area of this silicic acid prepared sample was measured to be 142 $m^2/g$. This example serves to demonstrate the superior selectivity to liquid products and higher surface area for a 10% $SiO_2$ on $\gamma$-$Al_2O_3$ catalyst prepared using colloidal silica as compared to silicic acid as the precursor. The surface area of a colloidal silica prepared 10% $SiO_2$ on $\gamma$-$Al_2O_3$ sample prepared from "Ludox" following drying at 120° C. was measured to be 149 $m^2/g$ for comparison to the activated samples of this example. This example further demonstrates the steam stability of the silica-modified aluminas of the instant invention.

EXAMPLE 3

The preparation of 15 wt% of $SiO_2$ on $Al_2O_3$ was carried out as described in Examples 1 and 2. For this preparation 11.25 g of the colloidal silica sold by DuPont under the trademark LUDOX AS-40 was added to sufficient distilled $H_2O$ to bring the total volume to 18.5 ml. This solution mixture is just sufficient to fill the pores of 25.5 g of $\gamma$-$Al_2O_3$. The resulting catalyst contains 15 wt% $SiO_2$ on a total sample basis following drying at 120° C. for 16 hrs. A portion of this sample was calcined at 950° C. for 16 hrs. in a muffle furnace. The MAT activity of this calcined sample was 18 with a conversion to liquids of 2.0 wt% based on feed. The activity and liquid selectivity of this 15 wt% $SiO_2$ on $\gamma$-$Al_2O_3$ sample is similar to that obtained for the 950° C. calcined 10 wt% $SiO_2$ on $\gamma$-$Al_2O_3$ sample of Example 1. The BET surface area of the calcined 15 wt% $SiO_2$ on $\gamma$-$Al_2O_3$ sample measured to be $132 M^2/g$.

Another portion of the 15 wt% $SiO_2$ on $\gamma$-$Al_2O_3$ sample was steamed at 870° C. for 16 hrs. as described in Example 2. The MAT activity of this sample was 26 with a conversion to liquids of 10.5 wt% based on feed. This example serves to demonstrate the superior liquid selectivity of 15 wt% $SiO_2$ on $\gamma$-$Al_2O_3$ compared to 10 wt% $SiO_2$ on $\gamma$-$Al_2O_3$ of Example 1 following an analogous steam activation for 16 hrs. at 870° C.

The BET surface area of the steamed 15 wt% $SiO_2$ on $\gamma$-$Al_2O_3$ was measured to be 151 $m^2/g$. This surface area is higher than obtained for the 950° C. calcined sample of this sample. This example, along with the results in Example 2, demonstrates that high temperature steam treatment results in a sample with higher catalyst surface area, as well as a catalyst with much higher cracking activity and selectivity to liquid products, than a sample calcined at high temperature.

In order to understand the differences between the calcination and the steam activaton of the 15 wt% $SiO_2$ on $\gamma$-$Al_2O_3$ sample, the X-ray power diffraction of the sample before and after activation were obtained. These spectrum are graphically illustrated in FIG. 3. The broad X-ray peak at $2\theta=21°$ is due to Si-O bonds of the $SiO_2$ phase, see FIG. 3. There is a small peak at $2\theta=19°$ due to alumina as shown in the figure. One can estimate the extent of dispersion of $SiO_2$ onto the $Al_2O_3$ surface from the drop in the intensity of the broad $SiO_2$ peak by subtracting the area of the alumina line. This has been done as indicated below. For the sample calcined at 950° C. there is little change in the intensity of the broad band although a slight change in shape was observed. In marked contrast the sample steamed at 870° C. shows a dramatic decrease in the intensity of the broad peak. It can be estimated that about 80% of the silica is dispersed by the steam treatment at 870° C. for 16 hours based on the peak intensity decrease. This result is entirely consistent with the differences in catalytic activity between the steamed and the calcined samples.

In an effort to confirm the dispersion of the colloidal silica $SiO_2$ by high temperature steam treatment the ESCA of 5, 10, and 15 wt% $SiO_2$ on $\gamma$-$Al_2O_3$ was obtained following treatment in steam at 870° C. The atomic percent silica was plotted versus the weight percent silica in the sample. The linear relationship as seen in FIG. 2 very strongly suggests that silica has significantly dispersed onto the alumina surface during the high temperature steam treatment. (See S. C. Fung, J. Catal. 58 484 (1979) and reference therein).

The results of this example will be useful in reference to other examples of the instant invention.

EXAMPLE 4

The preparation of 25 wt% $SiO_2$ on $\gamma$-$Al_2O_3$ was carried out as described in Examples 1 and 2. For this preparation to 31.25 g of a colloidal silica sold by DuPont under the trademark LUDOX AS-40 was added sufficient distilled $H_2O$ to bring the total volume to 26 ml. This solution mixture is just sufficient to fill the pores of 37.5 g of $Al_2O_3$. The resulting catalyst contains 25 wt% $SiO_2$ on a total sample basis following drying at 120° C. for 16 hours. A portion of this sample was steamed at 870° C. for 16 hrs. as described in Example 2. The MAT activity of this sample was 29 with a conversion to liquids of 8.6 wt% based on feed. This example serves to demonstrate that there is no advantage in having a silica content beyond 15 wt% on γ-Al$_2$O$_3$ as far as activity and selectivity are concerned. In fact, the X-ray power pattern of the 120° C. dried 25% sample compared to the 870° C. steamed sample shows that much of the intensity of the 2θ=21° line has been retained following the steam treatment. Apparently, for a 25 wt% SiO$_2$ on γ-Al$_2$O$_3$ sample only a fraction of the silica content need be dispersed onto the alumina to obtain significant catalytic cracking activity.

EXAMPLE 5

For comparison to other samples of the instant invention 5% SiO$_2$ on γ-Al$_2$O$_3$ samples were prepared using a colloidal silica sold by DuPont under the trademark LUDOX AS-40 as described in Example 1 and 2. A 5 wt% SiO$_2$ on γ-Al$_2$O$_3$ sample was activated by steam treatment at 870° C. as described in Example 2. The MAT activity of this sample was 27 with a conversion to liquids of 7.7 wt% based on feed. This result serves to demonstrate that 5% SiO$_2$ on γ-Al$_2$O$_3$ has the same activity of a sample containing much higher SiO$_2$, see Examples 1–4. Also the liquid selectivity of this sample is 73% that of the steamed 15% silica content sample of Example 3.

A steam treatment at 760° C. for 1 hr. of 5% SiO$_2$ on γ-Al$_2$O$_3$ sample prepared as described above results in a less active catalyst (MAT activity 18) compared to the 870° C. steam activation described previously. The 760° C. steam activation, however, does lead to substantial selectivity to liquids −4.9 wt% based on feed. These results will be useful for comparison to a sample prepared from a silica alkoxide precursor.

For comparison to the above samples a 5 wt% on SiO$_2$ on γ-Al$_2$O$_3$ catalyst was prepared by impregnation of silica tetraethoxide by the pore filling technique. The sample was treated in 10% H$_2$O-90% He at 500° C. to decompose the alkoxy groups of the silica precursor. Then the sample was steam activated at 870° C. as described in Example 2. The MAT activity of this sample was 28 with a conversion to liquids of 4.9 wt% based on feed.

The results of this example demonstrate that superior selectivity to liquids is obtained for a sample prepared from an inexpensive SiO$_2$ source such as colloidal silica compared to a more expensive silica alkoxide precursor. The alkoxide-prepared sample will be useful for comparison to other catalysts of the instant invention.

EXAMPLE 6

An investigation of NH$_3$ present during the steaming activation as described in Example 1 of 15 wt% SiO$_2$ on Al$_2$O$_3$ from a colloidal silica sold by DuPont under the trademark LUDOX AS-40 was carried out. The X-Ray powder pattern of the sample treated with 20% O$_2$/He sparged through 1N NH$_4$OH solution at 870° C. in a tube furnace compared to a sample treated analogously but without ammonia present in the aqueous phase, see FIG. 3. It is clear that the presence of NH$_3$ greatly accelerates the decrease in the broad X-ray line at 2θ=21°. In fact, the 1 hour treatment with NH$_3$ present is apparently similar to a steaming treatment without NH$_3$ for 16 hrs. The MAT activity of this NH$_3$ treated sample was 16 with a conversion to liquids of 2.4 wt% based on feed. It is apparent that NH$_3$ present during the steam treatment is effective in reducing the silica present as large aggregates but results in a sample with surprisingly low catalytic cracking activity. This example will be useful for comparison to other preparations of the instant invention.

In order to more fully evaluate the influence of steam and steam with NH$_3$ present in dispersing SiO$_2$ on γ-Al$_2$O$_3$ another portion of the 25 wt.% SiO$_2$ on Al$_2$O$_3$ sample described in this example was steamed for 1 hr. in a quartz tube furnace in 20% O$_2$/He sparged through H$_2$O. The MAT activity of this sample was 21 with a liquid conversion of 1.9% based on feed. The CPF and HPF were 0.72 and 1.60 respectively. This sample shows similar activity and selectivity to a portion of Sample A of Example 1 calcined at 950° C., see Example 1.

Another portion of Sample A was steamed for 1 hr. in a quartz tube furnace in 20% O$_2$/He sparged through a 1N NH$_4$OH in H$_2$O solution. The MAT activity of this sample was 21 with a liquid conversion of 3.0%. The corresponding selectivity to CPF and HPF were 0.93 and 3.48 respectively. The presence of NH$_3$ during the high temperature steam treatment of samples A clearly has a modest effect on the activity and liquid selectivity compared to steam without NH$_3$. Ammonia present during the steam activation step of the catalysts of the instant invention does not lead to superior catalytic cracking activity.

CO-GEL COMPARATIVE EXAMPLE

Example 7

In this example 2, 5 and 15 wt% SiO$_2$-content SiO$_2$-Al$_2$O$_3$ co-gels were prepared for comparison to the catalysts of the instant invention. A 2% SiO$_2$-content SiO$_2$-Al$_2$O$_3$ co-gel was prepared by mixing 101.7 g alumina sec-butoxide (containing 19.6 g Al$_2$O$_3$) with 1.01 g tetramethyl ortho silicate, Si(OCH$_3$)4, (containing 0.4 g SiO$_2$) to which 20 ml of H$_2$O was added. The precipitate was then dried at 120° C. in a N$_2$ purged muffle furnace for 4 hrs. The temperature was increased to 500° C. and held for 1 hr. in flowing N$_2$ to decompose the alkoxides. The sample was then calcined in air at 500° C. for 16 hrs.

A 5 wt% SiO$_2$-content SiO$_2$-Al$_2$O$_3$ co-gel was prepared by mixing 193.27 g aluminum sec-butoxide (containing 38 g Al$_2$O$_3$) with 5.06 g tetramethyl orthosilicate, Si(OCH$_3$)4 (containing 2 g SiO$_2$). Water was added to the mixture in three portions due to the exothermic heat of reaction. To the mixture was added 18.3 ml H$_2$O and then 8 ml H$_2$O was added subsequently. After 15 min. an additional 5 ml of H$_2$O was added. The precipitate was dried at 120° C. in a N$_2$ purged muffle furnace for 16 hrs. The temperature was increased to 500° C. and held for 1 hr. in flowing N$_2$ to decompose the alkoxides. The sample was then calcined in air at 500° C. for 16 hrs. The BET surface area of this sample was 449M$^2$/g.

A 15 wt% SiO$_2$-content SiO$_2$-Al$_2$O$_3$ co-gel was prepared by mixing 172.9 g alumina sec-butoxide (containing 34 g of Al$_2$O$_3$) with 15.18 g tetramethyl orthosilicate, Si(OCH$_3$)4, (containing 6 g SiO$_2$). 25 ml H$_2$O of water was added to the mixture and an exothermic reaction occurred. An additional 6 ml of H$_2$O was added to the precipitated gel. The precipitate was dried at 120° C. in a N$_2$ purged muffle furnace for 16 hrs. The temperature was increased to 500° C. and held for 1 hr in flowing N$_2$ to decompose the alkoxides. The sample was then calcined in air at 500° C. for 16 hrs. The BET surface area of the sample was 523 m$^2$g. The silica content of this sample was determined by Galbraith Laboratories and was found to be 17 wt% $SiO_2$.

These samples were prepared for comparison to the material prepared by the procedures of the instant invention. These three $SiO_2$-$Al_2O_3$ co-gel samples containing 2, 5 and 15 wt% $SiO_2$ were then analyzed by ESCA and the results are shown in FIG. 2.

EXAMPLE 8

In this example 5 wt.% $SiO_2$ and 14 wt.% $SiO_2$ on $\gamma$-$Al_2O_3$ samples were prepared by reacting tetraethoxy silane with $\gamma$-$Al_2O_3$. To 95 g of $\gamma$-$Al_2O_3$ (Engelhard Industries, reforming grade) was added 17.50 tetraethoxy silane (containing 5 g $SiO_2$) in a volume of methanol such that the total volume was 57 ml. The sample was then heated in a flow of He sparged through water at 120° C. for 2 hrs. to essentially remove the methanol. The sample was then heated in He sparged through $H_2O$ for 2 hrs. at 250° C. and for 1 hr. at 500° C. to decompose the alkoxy silane. The sample was than calcined in 20% $O_2$-80% He for 16 hrs. at 500° C.

In this example a 14% $SiO_2$ on $\gamma$-$Al_2O_3$ material was prepared by a two step impregnation and reaction procedure employing tetraethoxy silane. A two step procedure was necessary in order to get the desired $SiO_2$ content as the alkoxy silane tend to be volatile and not react completely with the $\gamma$-$Al_2O_3$ support (which is well-known in the art). To 70 g of $\gamma$-$Al_2O_3$ (Engelhard, reforming grade) was added 57.2 g of tetraethoxy silane (containing 16.5 g $SiO_2$) in a volume of methanol such that the total volume was 54 ml. The sample was heated in $N_2$ at 120° C. for 16 hrs. After the treatment most of the silicon alkoxide had volatilized from the support based on the weight of the sample. The sample was than heated at 250° C. under $N_2$ for 1 hr. and then calcined at 500° C. in air. The sample weight of 73 g gives an estimated $SiO_2$ content of 4.1 wt.% As the $SiO_2$ wt.% should have been 30 wt.% if all of the silicon alkoxide had reacted with the $\gamma$-$Al_2O_3$ than over 85% of the alkoxide had volatilized from the alumina support. This volitilization of the silicon alkoxide during their reaction with the alumina support contracts sharply with the procedure of the instant invention where a non-volatile colloidal $SiO_2$ or silicic acid is employed as the silica precursor.

To 73.2 g of the 4.1% $SiO_2$ on $\gamma$-$Al_2O_3$ sample of this example was added 32.5 g of tetraethaoxy silane (containing 9.4 g $SiO_2$) in a volume of methanol such that the total volume was 56 ml. In an attempt to decrease the silicon alkoxide volatilization the sample was heated for 4 hrs. in He sparged through $H_2O$, and then for 2 hrs. at 270° C. The sample was then calcined in air at 500° C. for 16 hrs. The wt.% $SiO_2$ content determined by Galbraith Laboratories was 13.95 wt.% based on duplicate sample analysis. Exxon Research and Engineering Company's analytical department confirmed this $SiO_2$ analysis as they obtained 14.9 wt.% $SiO_2$ content. The steam treatment of a silicon alkoxysilane preparation on $\gamma$-$Al_2O_3$ is important to reduce the loss of silane during heat treatment as is well-known in the art.

The 5 and 14 wt.% $SiO_2$ content $SiO_2$ on $\gamma$-$Al_2O_3$ samples of this example are useful for comparison to the materials prepared by the procedures of the instant invention. These two samples were analyzed by ESCA and the results are shown in FIG. 2.

TABLE 3

FIG. 3 Sample Description

A. $\gamma$-$Al_2O_3$ Steam Treated at 870° C. for 16 hrs.
B. 15 wt% $SiO_2$-$\gamma$-$Al_2O_3$ Sample Dried 120° C. for 16 hrs.
C. 15 wt% to $SiO_2$-$\gamma$-$Al_2O_3$ Sample Dried 120° C. for 16 hrs and Calcined in Air 950° C. for 16 hrs.
D. 15 wt% $SiO_2$-$\gamma$-$Al_2O_3$ Sample Dried 120° C. for 16 hrs. and Steamed With $NH_3$ Present at 870° C. for 1 hr.
E. 15 wt% $SiO_2$-$\gamma$-$Al_2O_3$ Sample Dried 120° C. for 16 hrs. and Steamed at 870° C. for 1 hr.
F. 15 wt% $SiO_2$-$\gamma$-$Al_2O_3$ Sample Dried 120° C. for 16 hrs. and Steamed at 870° C. for 16 hrs.

What is claimed is:

1. A composition comprising discrete particles of bulk silica supported on the external surface of a porous gamma alumina support and including therebetween a non-crystalline complex phase which is formed by a reaction between said silica and alumina, which phase exhibits properties different from bulk silica and bulk alumina and which phase is produced by steaming particles of silica and said gamma alumina at elevated temperatures of at least about 500° C., said composition exhibiting properties of both bulk silica and bulk alumina.

2. A composition comprising discrete areas of silica in a non-crystalline form supported principally on the external surface of a porous gamma alumina support and including therebetween a non-crystalline complex phase which is formed by a reaction between said silica and said alumina, which phase exhibits properties different from bulk silica and bulk alumina and which phase is produced by steaming particles of silica and said alumina support at elevated temperatures of at least about 500° C., said composition exhibiting properties of non-crystalline, non-bulk silica and properties of bulk alumina.

3. A composition comprising discrete particles of silica which particles exhibit properties of bulk silica and which are supported on the surface of silica in non-crystalline, non-bulk form which non-bulk silica is supported on the surface of gamma alumina and including therebetween said alumina and said non-bulk silica a non-crystalline complex phase which is formed by a reaction between said alumina and said non-bulk silica wherein said phase exhibits properties different from bulk silica and bulk alumina and which phase is produced by steaming particles of silica and said alumina at elevated temperatures of at least about 500° C., said composition exhibiting properties of bulk silica amorphous or non-crystalline silica supported on alumina, wherein the non-crystalline or amorphous silica exhibits properties different from either bulk crystalline or bulk amorphous silica.

4. A process for preparing a composition comprising silica supported on alumina which consists essentially of forming an aqueous slurry of particles of alumina and a silica material selected from the group consisting of silica and silicic acid, drying said aqueous slurry to obtain a composite of particles of alumina and silica, and heating said composite at a temperature of at least about 500° C. in a non-reducing environment and in the presence of steam for a time sufficient for at least a portion of the silica to react with the surface of the alumina to produce a non-crystalline complex phase between silica and said alumina which phase exhibits properties different from bulk silica and bulk alumina.

5. The process of claim 4 wherein said alumina is porous.

6. The process of claim 5 wherein at least a portion of the silica or silica precursor spreads out, wets and reacts with at least a portion of the surface of the alumina.

7. The process of claim 6 wherein at least a portion of the silica disperses over the surface of the alumina.

8. The process of claim 4 wherein said alumina is gamma alumina and said silica material is aqueous slurry of colloidal silica.

9. The process of claim 8 wherein said composite is formed by contacting calcined alumina with said aqueous slurry of colloidal silica.

10. The process of claim 9 wherein said calcined gamma alumina is calcined at 500° C.

* * * * *